United States Patent
Tamura et al.

(10) Patent No.: US 7,818,380 B2
(45) Date of Patent: Oct. 19, 2010

(54) METHOD AND SYSTEM FOR BROADCASTING SAFETY MESSAGES TO A VEHICLE

(75) Inventors: Kazuya Tamura, Rancho Palos Verdes, CA (US); Harry Harris, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 794 days.

(21) Appl. No.: 11/479,407

(22) Filed: Jun. 30, 2006

(65) Prior Publication Data
US 2007/0022173 A1    Jan. 25, 2007

Related U.S. Application Data

(63) Continuation-in-part of application No. 10/737,221, filed on Dec. 15, 2003, and a continuation-in-part of application No. 11/100,868, filed on Apr. 6, 2005.

(51) Int. Cl.
*G06F 13/00* (2006.01)
(52) U.S. Cl. ..................................... 709/206
(58) Field of Classification Search ............... 709/206, 709/207; 701/29–35
See application file for complete search history.

(56) References Cited

U.S. PATENT DOCUMENTS

| | | | |
|---|---|---|---|
| 3,646,580 A * | 2/1972 | Fuller et al. | 455/524 |
| 4,404,639 A | 9/1983 | McGuire | |
| 4,989,146 A | 1/1991 | Imajo | |
| 5,157,714 A * | 10/1992 | Spicer | 379/88.24 |
| 5,173,691 A | 12/1992 | Sumner | |
| 5,182,555 A | 1/1993 | Sumner | |
| 5,359,529 A | 10/1994 | Snider | |

(Continued)

FOREIGN PATENT DOCUMENTS

EP    0973299    1/2000

(Continued)

OTHER PUBLICATIONS

Japanese Decision of Rejection mailed Oct. 27, 2009 from Japanese Application No. 2007-507441 and English translation.

(Continued)

*Primary Examiner*—Robert B Harrell
(74) *Attorney, Agent, or Firm*—Plumsea Law Group, LLC

(57) ABSTRACT

A method and system is provided for broadcasting vehicle safety messages to one or more vehicles. In an embodiment, the system comprises an input device, processor, transmitter, receiver, memory module, display, and user interface. The input device is used for generating a vehicle safety message. The processor is coupled to the input device and is programmed to identify vehicles within a geographic region affected by the safety message. The transmitter is coupled to the processor for broadcasting the safety messages to the identified vehicles. The receiver is located on the vehicles for receiving the broadcasted safety message. The memory module is coupled to the receiver for storing the safety message. The display is operatively coupled to the memory module for indicating the receipt of the safety message to the vehicle driver. The user interface is coupled to the display for selecting the safety message to be communicated to the user.

22 Claims, 5 Drawing Sheets

U.S. PATENT DOCUMENTS

| | | |
|---|---|---|
| 5,388,045 A | 2/1995 | Kamiya et al. |
| 5,420,794 A | 5/1995 | James |
| 5,442,553 A | 8/1995 | Parrillo |
| 5,445,347 A | 8/1995 | Ng |
| 5,506,773 A | 4/1996 | Takaba et al. |
| 5,508,931 A | 4/1996 | Snider |
| 5,546,305 A | 8/1996 | Kondo |
| 5,551,064 A | 8/1996 | Nobbe et al. |
| 5,563,788 A | 10/1996 | Yoon |
| 5,590,040 A | 12/1996 | Abe et al. |
| 5,635,924 A | 6/1997 | Tran et al. |
| 5,636,245 A | 6/1997 | Ernst et al. |
| 5,648,768 A | 7/1997 | Bouve |
| 5,649,300 A | 7/1997 | Snyder et al. |
| 5,664,948 A | 9/1997 | Dimitriadis et al. |
| 5,671,195 A | 9/1997 | Lee |
| 5,682,525 A | 10/1997 | Bouve et al. |
| 5,696,676 A | 12/1997 | Takaba |
| 5,699,056 A | 12/1997 | Yoshida |
| 5,757,645 A | 5/1998 | Schneider et al. |
| 5,774,827 A | 6/1998 | Smith et al. |
| 5,802,545 A | 9/1998 | Coverdill |
| 5,862,510 A | 1/1999 | Saga et al. |
| 5,864,305 A | 1/1999 | Rosenquist |
| 5,878,056 A | 3/1999 | Black et al. |
| 5,892,463 A | 4/1999 | Hikita et al. |
| 5,926,108 A | 7/1999 | Wicks et al. |
| 5,931,878 A | 8/1999 | Chapin, Jr. |
| 5,959,577 A | 9/1999 | Fan et al. |
| 5,964,811 A | 10/1999 | Ishii et al. |
| 5,982,298 A | 11/1999 | Lappenbusch et al. |
| 5,999,882 A | 12/1999 | Simpson et al. |
| 6,032,046 A | 2/2000 | Nakano |
| 6,078,865 A | 6/2000 | Koyanagi |
| 6,085,146 A | 7/2000 | Kuribayashi et al. |
| 6,111,521 A | 8/2000 | Mulder et al. |
| 6,169,894 B1 | 1/2001 | McCormick et al. |
| 6,195,602 B1 | 2/2001 | Hazama et al. |
| 6,208,935 B1 | 3/2001 | Yamada et al. |
| 6,212,388 B1 | 4/2001 | Seo |
| 6,236,330 B1 | 5/2001 | Cohen |
| 6,240,364 B1 | 5/2001 | Kerner et al. |
| 6,246,320 B1 | 6/2001 | Monroe |
| 6,266,607 B1 | 7/2001 | Meis et al. |
| 6,266,608 B1 | 7/2001 | Pertz |
| 6,292,723 B1 | 9/2001 | Brogan et al. |
| 6,297,748 B1 | 10/2001 | Lappenbusch et al. |
| 6,308,120 B1 | 10/2001 | Good |
| 6,317,686 B1 | 11/2001 | Ran |
| 6,329,925 B1 | 12/2001 | Skiver et al. |
| 6,330,499 B1 | 12/2001 | Chou et al. |
| 6,339,736 B1 | 1/2002 | Moskowitz et al. |
| 6,351,709 B2 | 2/2002 | King et al. |
| 6,356,822 B1 | 3/2002 | Diaz et al. |
| 6,362,730 B2 | 3/2002 | Razavi et al. |
| 6,370,454 B1 | 4/2002 | Moore |
| 6,373,883 B1 | 4/2002 | Sorensen et al. |
| 6,381,533 B1 | 4/2002 | Crane et al. |
| 6,389,337 B1 | 5/2002 | Kolls |
| 6,397,067 B1 | 5/2002 | Tanaka et al. |
| 6,408,307 B1 | 6/2002 | Semple et al. |
| 6,421,593 B1 | 7/2002 | Kempen et al. |
| 6,434,455 B1 | 8/2002 | Snow et al. |
| 6,438,490 B2 | 8/2002 | Ohta |
| 6,459,961 B1 | 10/2002 | Obradovich et al. |
| 6,477,452 B2 | 11/2002 | Good |
| 6,480,105 B2 | 11/2002 | Edwards |
| 6,480,145 B1 | 11/2002 | Hasegawa |
| 6,510,317 B1 | 1/2003 | Marko et al. |
| 6,522,250 B1 | 2/2003 | Ernst et al. |
| 6,526,335 B1 | 2/2003 | Treyz et al. |
| 6,529,143 B2 | 3/2003 | Mikkola et al. |
| 6,539,269 B1 | 3/2003 | Jarrow et al. |
| 6,539,302 B1 | 3/2003 | Bender et al. |
| 6,542,794 B2 | 4/2003 | Obradovich et al. |
| 6,542,822 B1 | 4/2003 | Froeberg |
| 6,549,833 B2 | 4/2003 | Katagishi et al. |
| 6,552,682 B1 | 4/2003 | Fan |
| 6,553,289 B2 | 4/2003 | Maki et al. |
| 6,553,290 B1 | 4/2003 | Pillar |
| 6,553,308 B1 | 4/2003 | Uhlmann et al. |
| 6,553,313 B1 | 4/2003 | Froeberg |
| 6,577,934 B2 | 6/2003 | Matsunaga et al. |
| 6,583,734 B2 | 6/2003 | Bates et al. |
| 6,587,759 B2 | 7/2003 | Obradovich et al. |
| 6,587,777 B1 | 7/2003 | St. Pierre |
| 6,587,787 B1 | 7/2003 | Yokota |
| 6,590,507 B2 | 7/2003 | Burns |
| 6,594,576 B2 | 7/2003 | Fan et al. |
| 6,597,904 B1 | 7/2003 | Neustein |
| 6,603,405 B2 | 8/2003 | Smith |
| 6,604,038 B1 | 8/2003 | Lesesky et al. |
| 6,609,004 B1 | 8/2003 | Morse et al. |
| 6,611,201 B1 * | 8/2003 | Bishop et al. .......... 340/426.21 |
| 6,611,740 B2 | 8/2003 | Lowrey et al. |
| 6,611,753 B1 | 8/2003 | Millington |
| 6,615,130 B2 | 9/2003 | Myr |
| 6,615,133 B2 | 9/2003 | Boies et al. |
| 6,615,186 B1 | 9/2003 | Kolls |
| 6,618,669 B2 | 9/2003 | Ota et al. |
| 6,636,721 B2 | 10/2003 | Threadgill et al. |
| 6,647,417 B1 | 11/2003 | Hunter et al. |
| 6,657,558 B2 | 12/2003 | Horita et al. |
| 6,662,090 B2 | 12/2003 | Toyama et al. |
| 6,662,091 B2 | 12/2003 | Wilson et al. |
| 6,664,922 B1 | 12/2003 | Fan |
| 6,668,219 B2 | 12/2003 | Hwang et al. |
| 6,677,854 B2 | 1/2004 | Dix |
| 6,680,694 B1 | 1/2004 | Knockeart et al. |
| 6,681,120 B1 | 1/2004 | Kim |
| 6,697,633 B1 | 2/2004 | Dogan et al. |
| 6,701,231 B1 | 3/2004 | Borugian |
| 6,701,232 B2 | 3/2004 | Yamaki |
| 6,707,421 B1 | 3/2004 | Drury et al. |
| 6,711,398 B1 | 3/2004 | Talaie et al. |
| 6,714,797 B1 | 3/2004 | Rautila |
| 6,720,920 B2 | 4/2004 | Breed et al. |
| 6,721,685 B2 | 4/2004 | Kodama |
| 6,724,827 B1 | 4/2004 | Patsiokas et al. |
| 6,730,940 B1 | 5/2004 | Steranka et al. |
| 6,732,031 B1 | 5/2004 | Lightner et al. |
| 6,735,416 B1 | 5/2004 | Marko et al. |
| 6,735,504 B2 | 5/2004 | Katagishi et al. |
| 6,738,697 B2 | 5/2004 | Breed |
| 6,741,188 B1 | 5/2004 | Miller et al. |
| 6,741,834 B1 | 5/2004 | Godwin |
| 6,748,317 B2 | 6/2004 | Maruyama et al. |
| 6,754,485 B1 | 6/2004 | Obradovich et al. |
| 6,754,570 B2 | 6/2004 | Iihoshi et al. |
| 6,757,712 B1 | 6/2004 | Bastian et al. |
| 6,785,551 B1 | 8/2004 | Richard |
| 6,798,358 B2 | 9/2004 | Joyce et al. |
| 6,804,490 B2 * | 10/2004 | Cook et al. ................ 455/3.01 |
| 6,804,589 B2 | 10/2004 | Foxford et al. |
| 6,810,323 B1 | 10/2004 | Bullock et al. |
| 6,812,860 B1 | 11/2004 | Schwarzalder, Jr. |
| 6,812,888 B2 | 11/2004 | Drury et al. |
| 6,813,549 B2 | 11/2004 | Good |
| 6,816,778 B2 | 11/2004 | Diaz |
| 6,819,986 B2 | 11/2004 | Hong et al. |
| 6,823,169 B2 | 11/2004 | Marko et al. |
| 6,823,263 B1 | 11/2004 | Kelly et al. |
| 6,836,539 B2 | 12/2004 | Katou et al. |
| 6,836,667 B1 | 12/2004 | Smith, Jr. |

| | | |
|---|---|---|
| 6,847,871 B2 | 1/2005 | Malik et al. |
| 6,847,872 B2 | 1/2005 | Bodin et al. |
| 6,847,889 B2 | 1/2005 | Park et al. |
| 6,850,823 B2 | 2/2005 | Eun et al. |
| 6,859,720 B2 | 2/2005 | Satoh et al. |
| 6,870,487 B2 | 3/2005 | Nuesser et al. |
| 6,901,374 B1 | 5/2005 | Himes |
| 6,911,918 B2 | 6/2005 | Chen |
| 6,920,382 B2 | 7/2005 | Katagishi et al. |
| 6,928,423 B1 | 8/2005 | Yamanaka |
| 6,944,430 B2 | 9/2005 | Bertis |
| 6,971,070 B2 | 11/2005 | Obradovich et al. |
| 6,983,200 B2 | 1/2006 | Bodin et al. |
| 6,987,964 B2 | 1/2006 | Obradovich et al. |
| 6,988,034 B1 | 1/2006 | Marlatt et al. |
| 6,990,407 B1 | 1/2006 | Mbekeani et al. |
| 6,993,421 B2 * | 1/2006 | Pillar et al. ............... 701/33 |
| 7,010,297 B2 | 3/2006 | Yokota |
| 7,096,115 B1 | 8/2006 | Groth et al. |
| 7,139,659 B2 | 11/2006 | Mbekeani et al. |
| 7,174,301 B2 | 2/2007 | Florence et al. |
| 7,184,866 B2 * | 2/2007 | Squires et al. ............. 701/33 |
| 7,216,109 B1 | 5/2007 | Donner |
| 2001/0001848 A1 | 5/2001 | Oshizawa et al. |
| 2002/0016655 A1 | 2/2002 | Joao |
| 2002/0032507 A1 | 3/2002 | Diaz et al. |
| 2002/0044049 A1 | 4/2002 | Saito et al. |
| 2002/0049531 A1 | 4/2002 | Tanaka et al. |
| 2002/0067289 A1 | 6/2002 | Smith |
| 2002/0072378 A1 | 6/2002 | Gaal |
| 2002/0073012 A1 * | 6/2002 | Lowell et al. ............. 705/37 |
| 2002/0077741 A1 | 6/2002 | Hanebrink |
| 2002/0080022 A1 | 6/2002 | Edwards |
| 2002/0087237 A1 | 7/2002 | Ol et al. |
| 2002/0103582 A1 | 8/2002 | Ohmura et al. |
| 2002/0103583 A1 | 8/2002 | Ohmura et al. |
| 2002/0103597 A1 | 8/2002 | Takayama et al. |
| 2002/0152021 A1 | 10/2002 | Ota et al. |
| 2002/0156692 A1 | 10/2002 | Squeglia |
| 2002/0161495 A1 | 10/2002 | Yamaki |
| 2002/0161841 A1 | 10/2002 | Kinnunen |
| 2002/0165662 A1 | 11/2002 | Maruyama et al. |
| 2002/0165665 A1 | 11/2002 | Kim |
| 2002/0176494 A1 | 11/2002 | Zhao et al. |
| 2002/0177926 A1 | 11/2002 | Lockwood et al. |
| 2002/0193923 A1 | 12/2002 | Toyama et al. |
| 2002/0198632 A1 | 12/2002 | Breed et al. |
| 2002/0198637 A1 | 12/2002 | Shibata |
| 2003/0028297 A1 | 2/2003 | Iihoshi et al. |
| 2003/0051239 A1 | 3/2003 | Hudspeth |
| 2003/0063628 A1 | 4/2003 | Marko et al. |
| 2003/0069683 A1 | 4/2003 | Lapidot |
| 2003/0081587 A1 | 5/2003 | Ichiyoshi |
| 2003/0083813 A1 | 5/2003 | Park |
| 2003/0093476 A1 | 5/2003 | Syed |
| 2003/0095038 A1 | 5/2003 | Dix |
| 2003/0098782 A1 | 5/2003 | Eastman et al. |
| 2003/0109972 A1 | 6/2003 | Tak |
| 2003/0158640 A1 | 8/2003 | Pillar et al. |
| 2003/0169182 A1 | 9/2003 | Wilhelm et al. |
| 2003/0191583 A1 | 10/2003 | Uhlmann et al. |
| 2003/0195695 A1 | 10/2003 | Maruyama et al. |
| 2003/0195814 A1 | 10/2003 | Striemer |
| 2003/0216859 A1 | 11/2003 | Martell et al. |
| 2003/0225516 A1 | 12/2003 | DeKock et al. |
| 2003/0229441 A1 | 12/2003 | Pechatnikov et al. |
| 2003/0236613 A1 | 12/2003 | Satoh et al. |
| 2004/0012501 A1 | 1/2004 | Mazzara et al. |
| 2004/0023647 A1 * | 2/2004 | Mazzara et al. ............. 455/419 |
| 2004/0024753 A1 | 2/2004 | Chane et al. |
| 2004/0044605 A1 | 3/2004 | Kress Bodin et al. |
| 2004/0059781 A1 | 3/2004 | Yoakum et al. |
| 2004/0068362 A1 | 4/2004 | Maekawa et al. |
| 2004/0068364 A1 | 4/2004 | Zhao et al. |
| 2004/0073356 A1 | 4/2004 | Craine |
| 2004/0080430 A1 | 4/2004 | Videtich |
| 2004/0085198 A1 | 5/2004 | Saito et al. |
| 2004/0093243 A1 | 5/2004 | Bodin |
| 2004/0102898 A1 | 5/2004 | Yokota et al. |
| 2004/0104842 A1 | 6/2004 | Drury et al. |
| 2004/0110515 A1 | 6/2004 | Blumberg et al. |
| 2004/0148099 A1 | 7/2004 | Kim |
| 2004/0167707 A1 | 8/2004 | Bragansa et al. |
| 2004/0198217 A1 | 10/2004 | Lee et al. |
| 2004/0203630 A1 | 10/2004 | Wang |
| 2004/0204821 A1 | 10/2004 | Tu |
| 2004/0204842 A1 | 10/2004 | Shinozaki |
| 2004/0208204 A1 | 10/2004 | Crinon |
| 2004/0233070 A1 | 11/2004 | Finnern |
| 2004/0233101 A1 | 11/2004 | Kim |
| 2004/0239531 A1 | 12/2004 | Adamczyk |
| 2004/0249529 A1 | 12/2004 | Kelly et al. |
| 2004/0249530 A1 | 12/2004 | Kelly et al. |
| 2004/0249531 A1 | 12/2004 | Kelly et al. |
| 2004/0249532 A1 | 12/2004 | Kelly et al. |
| 2004/0252197 A1 | 12/2004 | Fraley et al. |
| 2004/0260786 A1 | 12/2004 | Barile |
| 2005/0001743 A1 | 1/2005 | Haemerle |
| 2005/0015186 A1 | 1/2005 | Kelly et al. |
| 2005/0015199 A1 | 1/2005 | Lokshin et al. |
| 2005/0021197 A1 | 1/2005 | Zimmerman et al. |
| 2005/0021199 A1 | 1/2005 | Zimmerman et al. |
| 2005/0027436 A1 | 2/2005 | Yoshikawa et al. |
| 2005/0027449 A1 | 2/2005 | Marsh |
| 2005/0033511 A1 | 2/2005 | Pechatnikov et al. |
| 2005/0038581 A1 | 2/2005 | Kapolka et al. |
| 2005/0038596 A1 | 2/2005 | Yang et al. |
| 2005/0043880 A1 | 2/2005 | Yamane et al. |
| 2005/0060070 A1 | 3/2005 | Kapolka et al. |
| 2005/0068174 A1 | 3/2005 | Oesterling et al. |
| 2005/0075095 A1 | 4/2005 | Dillon |
| 2005/0080519 A1 | 4/2005 | Oesterling et al. |
| 2005/0090951 A1 | 4/2005 | Good |
| 2005/0096811 A1 | 5/2005 | Bodin et al. |
| 2005/0125117 A1 | 6/2005 | Breed |
| 2005/0131626 A1 | 6/2005 | Ignatin |
| 2005/0137763 A1 | 6/2005 | Watkins |
| 2005/0137790 A1 | 6/2005 | Yamada et al. |
| 2005/0288856 A1 | 12/2005 | Uyeki et al. |
| 2006/0055565 A1 | 3/2006 | Kawamata et al. |
| 2006/0116800 A1 * | 6/2006 | Obradovich et al. ......... 701/29 |

FOREIGN PATENT DOCUMENTS

| | | |
|---|---|---|
| EP | 1137210 | 9/2001 |
| JP | 6276056 | 9/1994 |
| JP | 8149029 | 6/1996 |
| JP | 2000112978 | 4/2000 |
| JP | 2000201104 | 7/2000 |
| JP | 2000293788 | 10/2000 |
| JP | 2001168743 | 6/2001 |
| JP | 2001343979 | 12/2001 |
| JP | 2003122785 | 4/2003 |

OTHER PUBLICATIONS

Japanese Office Action mailed Nov. 4, 2009, from Japanese Patent Application No. 2006-545357 and English translation.
U.S. Office Action mailed Oct. 14, 2009 from U.S. Appl. No. 10/737,221.

* cited by examiner

METHOD AND SYSTEM FOR BROADCASTING SAFETY MESSAGES TO A VEHICLE

RELATED APPLICATION

This application is a continuation-in-part of co-pending application Ser. No. 10/737,221, filed Dec. 15, 2003. This application also is a continuation-in-part of co-pending application Ser. No. 11/100,868, filed Apr. 6, 2005.

BACKGROUND OF THE INVENTION

1. Field of the Invention

The present invention relates to informing vehicle owners regarding vehicle safety messages, and more particularly, to a method and system for broadcasting safety messages to a vehicle.

2. Description of Related Art

Existing methods and systems for the upkeep and maintenance of vehicles are limited in their ability to inform vehicle owners about recommended vehicle service. Examples of existing service/maintenance information systems include warning lights that are activated upon the detection of certain conditions, such as low oil levels, etc. Vehicle owners sometimes observe such preprogrammed messages, but do not comprehend the significance of the messages and/or how soon vehicles should be taken in for service. Moreover, because such systems are based on preprogrammed maintenance conditions or schedules, the systems are particularly limited in their ability to notify vehicle owners about subsequent developments, such as car part/product recall messages or the development of improved or updated parts to be used in their vehicles.

Through their own tests, inspection procedures and information gathering systems, vehicle manufacturers may discover that a safety defect exists or that the requirements of a safety standard have not been met. The manufacturer is then obligated to report such findings to the National Highway Traffic Safety Administration (NHTSA), and take appropriate action to correct the problem. Within a reasonable time after the determination of a safety defect or noncompliance, vehicle manufacturers must notify by letter all registered owners and purchasers of the affected vehicles of the existence of the problem and give an evaluation of its risk to motor vehicle safety.

In the past, vehicle manufacturers and other service providers had no recourse but to mail vehicle safety messages to vehicle owners in order to notify of a safety issue or the development of an improved part to be used in the vehicle. The process of mailing safety messages is not only expensive, but timely, cumbersome and inefficient. The vehicle manufacturer has no indication that the safety message was received by the vehicle owner as mailing addresses may be incorrect or mail must be forwarded to a newer address causing delays in communication and difficulty for vehicle manufacturers to notify a vehicle owner of safety issues regarding a specific vehicle.

One method used to overcome these limitations is to use one-to-one communication systems, such as the OnStar service offered by General Motors Corporation, in an attempt to send vehicle-specific information to a particular vehicle. The OnStar service verbally reminds vehicle owners of a recall message, via a human operator or advisor, when the OnStar service is activated and the owner has failed to take their vehicle in for recall repairs. For the case of a recall message, many vehicles require the same safety information. The OnStar service utilizes the cellular network to transmit messages to a vehicle. Carriers in the cellular network have a limited bandwidth or data transfer capacity within the cellular network. Thus, the one-to-one approach to notifying the vehicles would involve the transmittal of the same information multiple times to a plurality of vehicles, resulting in a waste of precious bandwidth.

Another method using a one-to-one communication system involves sending an e-mail containing vehicle-specific information to a group of vehicles that may be affected by a recall message. The vehicle contains an e-mail client with an e-mail address unique to the vehicle. A recall message is then sent to the specific e-mail addresses of the affected vehicles and an e-mail server, located external to the vehicle, routes the e-mail message to each e-mail address specified in the header of the e-mail message.

Other methods currently in use involve the transmittal of the same information to all vehicles (i.e., one-to-many), rather than targeting a subset of the vehicles. An example would be a notification relying on mass media (e.g., commercial radio and television broadcasts) to notify the public of a recall. Media coverage provides notification for those who cannot be reached by mailings, and reinforces the message for those who receive a direct message. Recall advertising, however, can be complicated by problems in reaching the affected consumers and, additionally, vehicle owners would receive recall notifications that are not relevant to their vehicle and would make it more likely that they would ignore a safety message that is relevant.

For routine service work, such as oil and brake maintenance services, the dealer often has the needed parts (e.g., oil filters, brake pads, etc.) in its inventory. For specialized service involving product recalls/updates, however, the dealer may not have the needed parts in stock, which can delay the service time or cause the vehicle owner to make a subsequent trip to the dealer when the parts become available. When parts are not in stock, vehicle manufacturers may negotiate with the NHTSA in order to coordinate regional safety message mailings based upon availability of parts in that region.

As such, what is needed is a system and method for using a one-to-many approach to selectively target vehicles affected by a vehicle part recall/update message. The method would preferably involve the selection of affected vehicle owners, coordination with dealers on parts inventory, and subsequent transmittal of a broadcast message directly to the vehicle that requires service in order to quickly notify the affected vehicle owner of the safety issue. The method and system described herein would better ensure vehicle repair, reduce the need for multiple visits to the dealer, and improve the effectiveness of recall campaigns.

SUMMARY OF THE INVENTION

The present invention addresses the shortcomings of the prior art systems and methods. In particular, the present invention is directed to a method and system for broadcasting vehicle safety messages to one or more vehicles.

In accordance with one aspect of the embodiments described herein, a method for broadcasting safety messages to a vehicle comprises the steps of: (a) generating a vehicle safety message; (b) identifying vehicles within a predefined geographic region that are affected by the message; (c) broadcasting the vehicle safety message to the respective identified vehicles; (d) receiving the vehicle safety message on the vehicle; (e) storing the vehicle safety message in memory on the vehicle; (f) indicating the receipt of the vehicle safety message to the vehicle driver; and (g) communicating the content of the vehicle safety message to the vehicle driver.

In another embodiment of the invention, a system for broadcasting safety messages to a vehicle comprises an input device, a processor, a transmitter, a receiver, a memory module, a display, and a user interface. The input device is used for generating a vehicle safety message. The processor is operatively coupled to the input device and is programmed to identify vehicles within a predefined geographic region that are affected by the vehicle safety message. The transmitter is operatively coupled to the processor for broadcasting the vehicle safety messages to the identified vehicles. The receiver is located on the vehicles for receiving the broadcasted vehicle safety message. The memory module is operatively coupled to the receiver for storing the vehicle safety message. The display is operatively coupled to the memory module for indicating the receipt of the vehicle safety message to the vehicle driver. The user interface is operatively coupled to the display for selecting the vehicle safety message to be communicated to the user.

A more complete understanding of the method and system for broadcasting safety messages to a vehicle will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention generally relates to systems and methods for broadcasting safety messages to a vehicle. In particular, the present invention involves the selection of affected vehicle owners, coordination with dealers on parts inventory, and subsequent transmittal of a broadcast message directly to the vehicle that requires service in order to quickly and efficiently notify the affected vehicle owner of the safety issue. In the detailed description that follows, like element numerals are used to describe like elements illustrated in one or more of the figures.

Figure 1A:
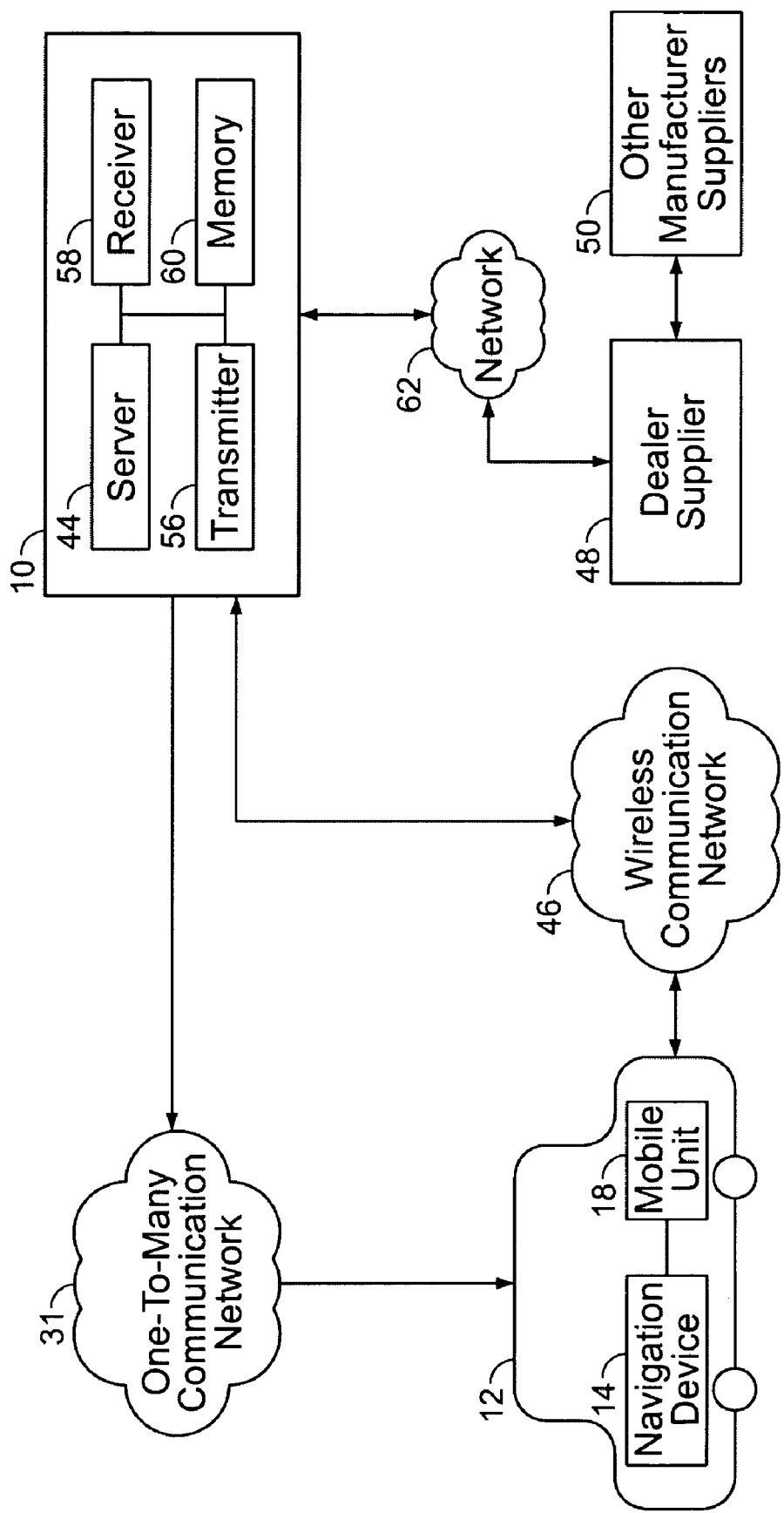
FIG. 1a is a schematic diagram of a first embodiment of a communication system pursuant to aspects of the invention.

With reference to FIG. 1a, there is provided a first embodiment of a system for the exchange of information between a remote location 10 and a vehicle 12. The remote location 10 is a server system for outputting vehicle broadcast data that is controlled by the vehicle manufacturer. The vehicle 12 includes a navigation device 14 and a mobile unit 18. The navigation device 14 is an electronic system used to provide driving directions, display of messages to the vehicle operator, and audio playback of messages or satellite radio broadcasting. The navigation device 14 is operatively coupled to the mobile unit 18 and supports the receipt of content from the remote location 10 that is broadcast over a one-to-many communication network 31. One-to-many communication systems include systems that can send information from one source to a plurality of receivers, such as a broadcast network. Broadcast networks include television, radio, and satellite networks.

The mobile unit 18 may also receive messaging from the remote location 10 by using technology such as GPRS through the vehicle owner's mobile phone. In the embodiment shown in FIG. 1a, the mobile unit 18 is used to receive information from the remote location 10 over the one-to-many communication network 31, and can both receive and transmit information from and to the remote location 10 over the wireless communication network 46.

In a preferred embodiment of the invention, vehicle safety messages are generated at the remote location 10 and are subsequently broadcast over the one-to-many communication network 31 to the vehicle 12. The mobile unit 18 receives the broadcasted message and transmits it to the navigation device 14 for display to the vehicle driver on the user interface of the navigation device 14, which will be described in further detail.

The remote location 10 includes a remote server 44, a remote transmitter 56, remote receiver 58, and a remote memory 60, that are each in communication with one another. The remote transmitter 56 communicates with the navigation device 14 and mobile unit 18 by way of the broadcast 31 and wireless 46 communication networks. The remote receiver 58 communicates with the navigation device 14 and mobile unit 18 by way of the wireless 46 communication network. The remote location 10 is also in communication with dealer suppliers 48 and other manufacturer suppliers 50, such as parts manufacturers, by way of supplier network 62. The supplier network 62 is typically a wide area network (WAN) such as the Internet but some suppliers may access the remote location 10 via a local area network (LAN). The remote server 44 supports the routing of message content over the broadcast network 31, wireless network 46, and supplier network 62. The dealer supplier 48 may transmit updated user profiles or dealer parts inventory to the remote location 10. Other manufacturer suppliers 50 may only access the supplier network 62 through the dealer supplier 48. The user profile comprises information regarding vehicle owner's preferences as well as user identity information. A plurality of user profiles are stored in a user profile database, which is typically transmitted and updated by the dealer supplier 48 and is stored in the remote memory 60. The remote server 44 also comprises an input unit, such as a keyboard, that allows the vehicle manufacturer to enter a vehicle safety message into memory 60 and a processor unit that controls the communication over the various networks 31, 46, 62 and interfaces to other servers within the various networks. In one embodiment, the processor unit is programmed to: (a) identify vehicles within a predefined geographic region that are affected by the message; (b) select a dealer located in the geographic region; and (c) verify that updated vehicle part is available at the dealer.

In one embodiment, the remote server 44 receives and processes information relating to recalls/updates for vehicle products or parts and the availability of parts at the dealer. The server 44 is in communication with the vehicle over a one-to-many communication network 31. In the present embodiment, the one-to-many communication network 31 comprises a broadcast center that is further in communication with one or more communication satellites that relay the vehicle safety message as a broadcast message to a mobile unit 18 in the owner's vehicle 12. In the present embodiment, the broadcast center and the satellites are part of a satellite radio broadcasting system (e.g., XM Satellite Radio). It will be understood that the safety message can be broadcast via any suitable information broadcast system (e.g., FM radio, AM radio, or the like), and is not limited to the satellite radio broadcast system. In one embodiment, the mobile unit 18 relays the safety message to an onboard computer system, such as the vehicle's navigation system 14, which in turn displays the safety message on a display unit. In another embodiment, the safety message is provided to the vehicle owner via an auditory message played on the vehicle's audio system.

The remote server 44 can also transmit the safety message over the wireless communications network 46. In one embodiment, the wireless communications network 46 comprises a mobile or cellular communications provider that relays the safety message to the vehicle owner's mobile phone. The message is then transmitted (e.g., via Bluetooth wireless data communication format or the like) from the owner's mobile phone to the vehicle's onboard mobile unit 18, which in turn displays the message on the display of the vehicle's navigation device 14 and/or provides an auditory version of the message via the vehicle's audio system.

The remove server 44 can transmit raw data (e.g., recall/update data, parts availability, vehicle identification numbers (VINs) of affected vehicles, vehicle owner data) to another database or server located at the dealer 48 to determine parts availability at the dealer site for service of the affected vehicles.

Figure 1B:
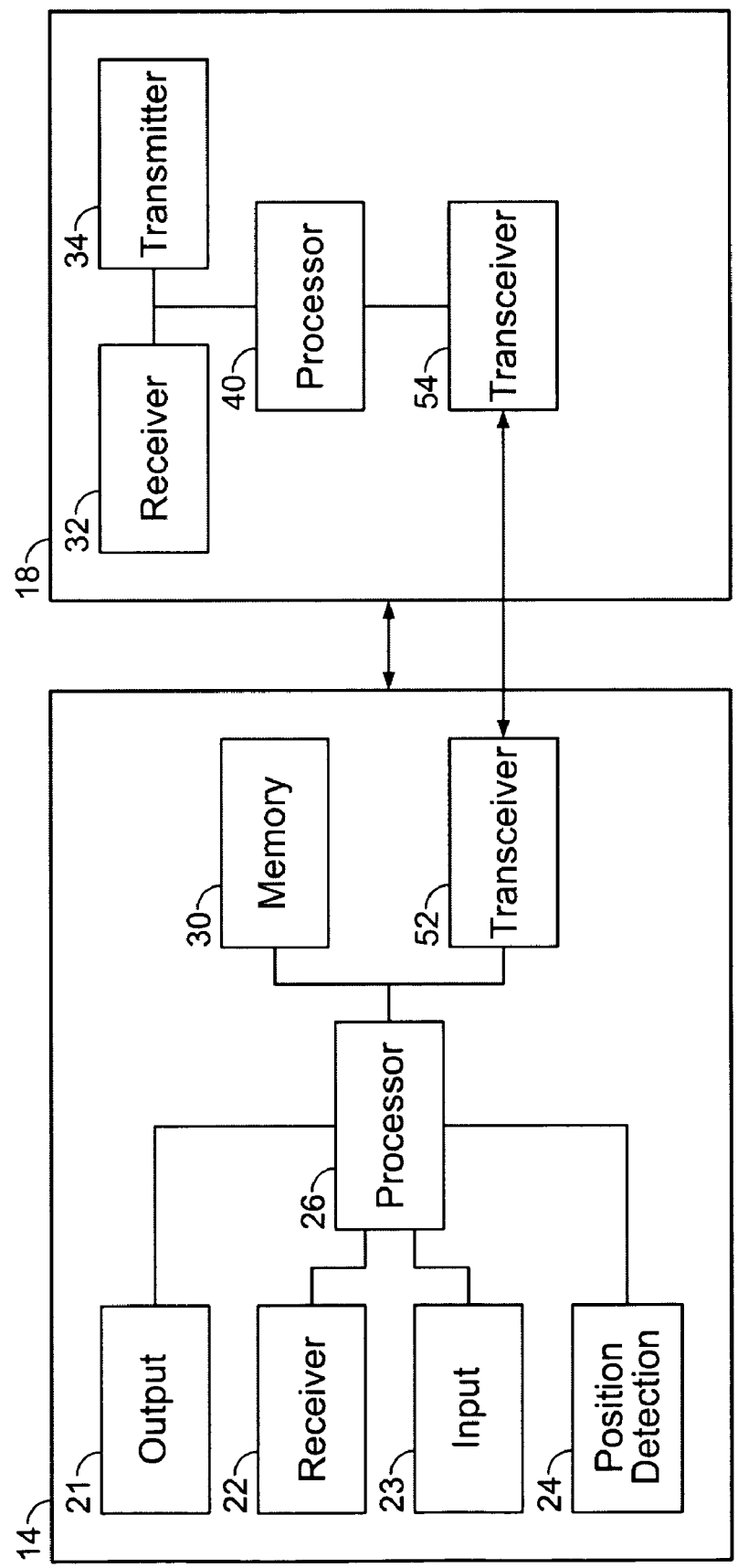
FIG. 1b is a schematic diagram of a navigation device in communication with a mobile unit.

FIG. 1b shows an expanded view of both the navigation device 14 and the mobile unit 18 contained on the vehicle 12. The navigation device 14 may include an output unit 21, a receiver unit 22, an input unit 23, a position detection unit 24, a navigation memory unit 30, a navigation processor unit 26, and an RF transceiver unit 52 that are all in electrical communication with one another. The navigation memory unit 30 includes at least a portion of a user profile and in some embodiments may include an entire user profile. The user profile comprises information regarding the vehicle owner's preferences as well as user identity information and traffic-related information. In addition, the navigation memory unit 30 includes a road map database portion and, in some embodiments, includes a disk reading unit for reading road map information not built into the navigation device 14. The user profile and/or the road map database stored in the memory 30 may be updated in the vehicle by way of the input unit 23, which can include at least one of a keyboard, a touch sensitive display, jog-dial control, and a microphone. The user profile and/or the road map database may also be updated by way of information received through the receiver unit 22 and/or the RF transceiver unit 52.

The receiver unit 22 receives information from the remote location 10 and, in one embodiment, is in communication with the remote location by way of a one-to-many communication network 31 (see FIG. 1a). The information received by the receiver 22 may be processed by the navigation processor unit 26. The processed information may then be displayed by way of the output unit 21, which includes at least one of a display and a speaker. In one embodiment, the receiver unit 22, the navigation processor unit 26 and the output unit 21 are provided access to only subsets of the received broadcast information based on user preferences and/or traffic information demands.

The position detection unit 24 may include a positioning receiver that communicates with a plurality of positioning satellites (e.g., GPS satellites) to determine the position of the vehicle 12. For example, in one embodiment, a GPS receiver searches for and collects GPS information (or signals) broadcast from three or more GPS satellites that are in view of the GPS receiver. Next, using the time interval between the broadcast time and reception time of each broadcast signal, the GPS receiver calculates the distance between the GPS receiver and each of the GPS satellites in view. These distance measurements, along with the position and time information received in the broadcast signals, allow the GPS receiver to calculate the geographic position of the vehicle 12.

In the embodiment shown in FIG. 1b, the mobile unit 18 includes a wireless receiver 32, a wireless transmitter 34, a mobile unit processor 40, and an RF transceiver unit 54 that are in communication with one another. The mobile unit 18 is in two-way communication with the remote location 10 by way of the receiver 32, the transmitter 34, and the wireless communication network 46, which may comprise numerous base stations. In one embodiment, information is transmitted from or to the vehicle or remote location over a data channel of the wireless communication network 46 (e.g., a high bandwidth GPRS/1XRTT channel, a low bandwidth DTMF channel, etc.). The receiver 32 receives information from the remote location 10, such as safety messages, and the transmitter 34 transmits information back to the remote location 10.

In one embodiment, the navigation device 14 and mobile unit 18 are in communication with one another by way of RF transceiver units 54 and 52. Both the navigation device 14 and the mobile unit 18 include RF transceiver units 52, 54, which, in one embodiment, comply with the Bluetooth® wireless data communication format or the like. The RF transceiver units 52, 54 allow the navigation device 14 and the mobile unit 18 to communicate with one another.

The safety notifications are transmitted from the remote location 10 to the navigation device 14 by way of the broadcast network 31. In other embodiments, the safety notification may be transmitted to the vehicles 12 by way of the wireless network 46. At the vehicle, the safety notification is stored in the memory 30 of the navigation device 14, and the message is made accessible to the vehicle owner by way of the output unit 21 of the navigation device 14. Further details regarding embodiments of information exchange systems can be found in U.S. patent application Ser. No. 11/100,868, filed Apr. 6, 2005, titled "Method and System for Controlling the Exchange of Vehicle Related Messages," the disclosure of which is incorporated in its entirety herein by reference.

As explained above, in accordance with one aspect of the embodiments described herein, there is provided a system and method for broadcasting a vehicle safety message to a vehicle. In one embodiment, the method comprises discovering a safety issue through vehicle testing that requires notification of the affected vehicle owner base. The affected vehicles for the recall are determined by filtering the vehicle sales database records based upon the recall criteria (e.g., by vehicle type and model year). The vehicle manufacturer then selects a subset of affected vehicles based upon geographical region and verifies that the needed part(s) for service are available at the dealer(s) in that region. The method further comprises initiating contact with the vehicle owner by sending a vehicle safety message via a satellite radio broadcast network. The message will subsequently be received and stored on the affected vehicle's navigation device. The vehicle owner then sees an indication that a message has been received and uses the navigation controls to select the message for viewing on the navigation display.

In embodiments that involve broadcasting the safety message to the affected vehicle owners in a given geographic region, one or a few messages may be transmitted over a one-to-many communication network 31 that each comprise a plurality of one-to-one portions, as opposed to transmitting a separate message for each vehicle. Each one-to-one portion will typically be applicable to a single affected vehicle and allows for the broadcast of targeted vehicle information over a one-to-many network 31 using less bandwidth than if each message was sent individually. When broadcasting a message over a one-to-many communication network 31, all vehicles 12 within range of the network 31 may receive the message, however the message will be filtered by the mobile unit 18 of each vehicle 12 and only vehicles 12 specified in the one-to-one portions of the message will store the message for communication to the vehicle owner. In one embodiment, each one-to-one portion comprises a filter code section. The filter code section can comprise a given affected vehicle's vehicle identification number (VIN) or another suitable vehicle identifier known in the art. The vehicle identifier will typically comprise information relating to the vehicle type, model year, mileage, sales zone, etc., as explained in further detail in U.S. patent application Ser. No. 11/232,311, filed Sep. 20, 2005, titled "Method and System for Broadcasting Data Messages to a Vehicle," the content of which is incorporated in its entirety into this disclosure by reference.

Figure 2:
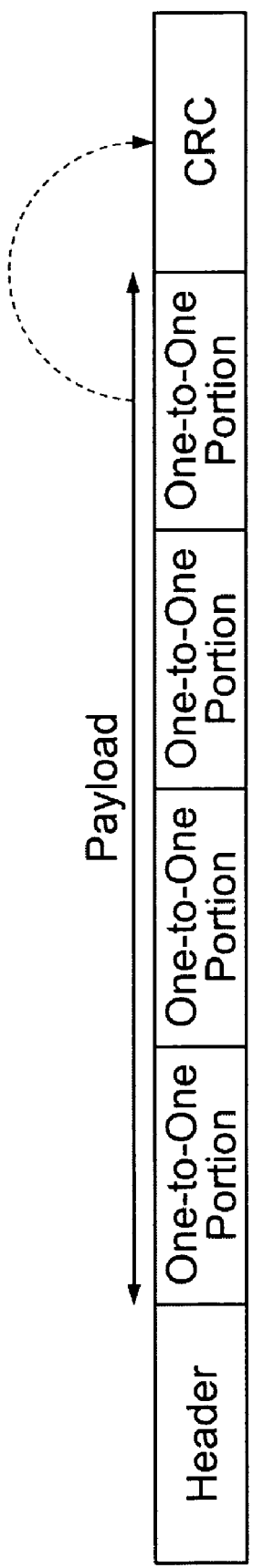
FIG. 2 is a block diagram of an embodiment of a multi-packet broadcast data message.

FIG. 2 provides a block diagram of an embodiment of a multi-packet broadcast data message containing one-to-one linked data regarding safety messages for the affected vehicles. The multi-packet broadcast data message includes a header, a payload section, and a CRC code. The payload section of the multi-packet broadcast data message contains a plurality of message portions. Each message portion is targeted to a single affected vehicle using the VIN number/code as the filter code section, and includes information regarding a safety message for the affected vehicle. The CRC code may be generated using any suitable algorithm, such as, the following polynomial $G(X)=X^{16}+X^{15}+X^2+1$. It will also be understood that the CRC code is merely exemplary, and that any other suitable method of checking for errors in the data message can be implemented with the present invention. Further detail regarding multi-packet broadcast data messages is provided in U.S. patent application Ser. No. 11/266,879, filed Nov. 4, 2005, titled "Data Broadcast Method for Traffic Information," the disclosure of which is incorporated in its entirety herein by reference.

Figure 3:
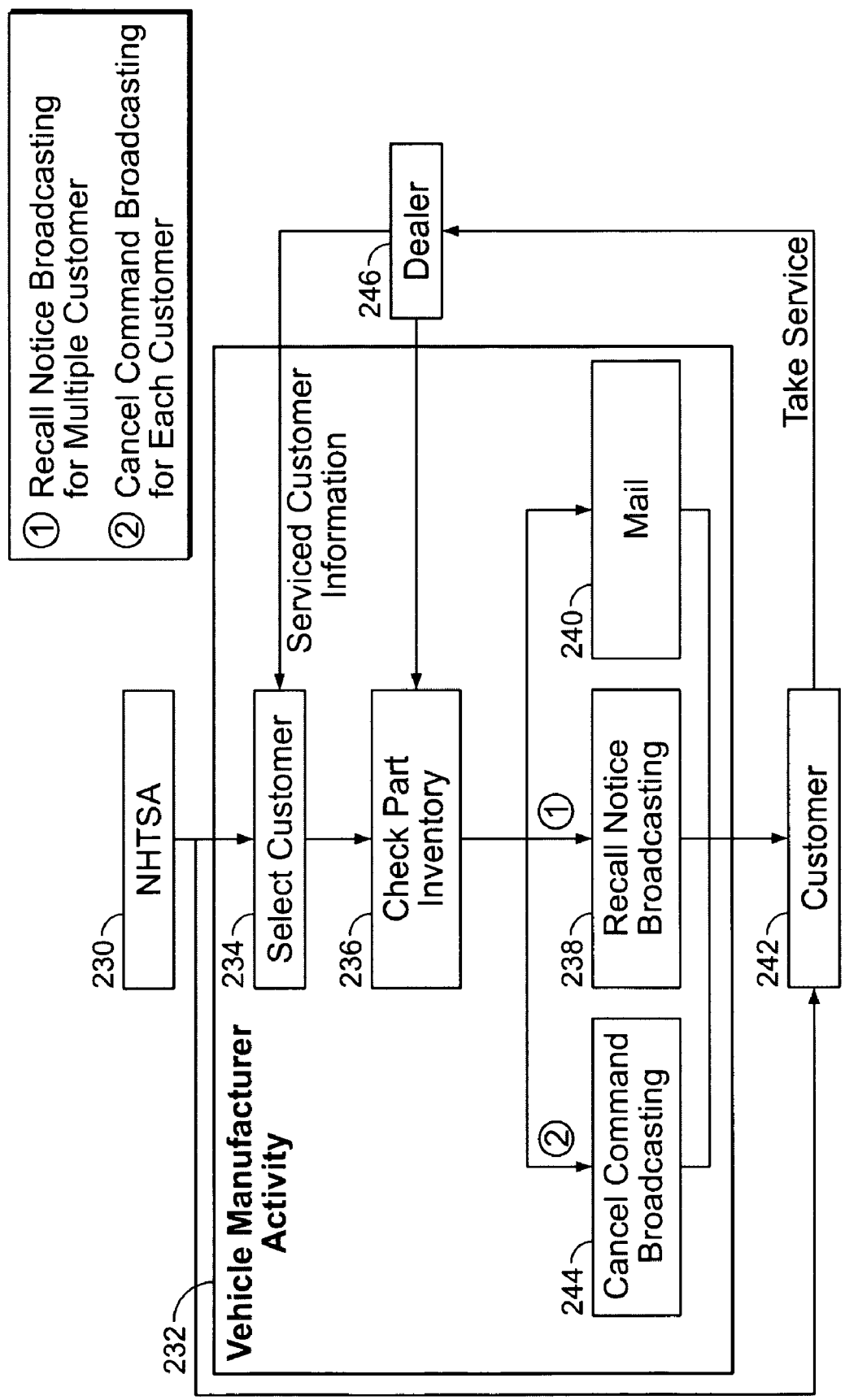
FIG. 3 outlines the steps of a method for broadcasting a vehicle safety message from a vehicle manufacturer.

FIG. 3 illustrates an exemplary method for communicating vehicle safety alerts/reminders from the broadcast server. First, in step 230, the vehicle manufacturer receives an indication of a safety issue from the NHTSA or, alternately, notifies the NHTSA of a recently discovered safety issue. Steps 234-244 are activities that are performed by the vehicle manufacturer 232. Step 234 involves identifying the affected vehicles that are required to receive a safety notification. The affected vehicles can be identified via the VINs or other suitable identification/registration technique known in the art. The identification of affected vehicles may be carried out for a particular, predefined geographic region. At step 236, the exemplary method comprises determining whether the required parts are available at the dealer 246. If the required parts are available at the dealer 246, then the method proceeds on to the next step; otherwise, negotiations may take place with the NHTSA to allow for separate broadcasts of safety messages and mailings based upon regions where parts are currently available. If needed, the required parts are shipped from the parts manufacturers or warehouses to the dealer 246. Once parts are available, the method proceeds to step 244, 238, or 240 depending on whether the vehicle owner contact will be via a cancellation broadcast, a safety message broadcast, or a mailing, respectively. For the case of a mailing, shown in step 240, a safety notification letter is mailed to the vehicle owner as required by the NHTSA. For a broadcast recall message, shown in step 238, the safety message is entered into the server with appropriate vehicle identification information and a broadcast safety message is sent over the one-to-many communication system directed toward the affected vehicles selected during negotiations with the NHTSA. In one embodiment, if a vehicle safety message was previously broadcast and the vehicle manufacturer determines that the safety message is no longer in effect or should be cancelled, a cancellation command will be broadcast, as shown in step 244, to clear the stored safety message from the affected vehicles. For each of the three aforementioned steps, the method proceeds on to step 242 for the vehicle owner to take action on the safety notification.

At step 242, the vehicle owner may choose to service the affected vehicle at the dealer 246 to correct the problem indicated in the safety message received. In this case, the dealer will take note of the service and will relay the service information back to the manufacturer and the method proceeds back to step 234, removing the affected vehicle from the pool of vehicle owners requiring subsequent safety message reminders.

Figure 4:
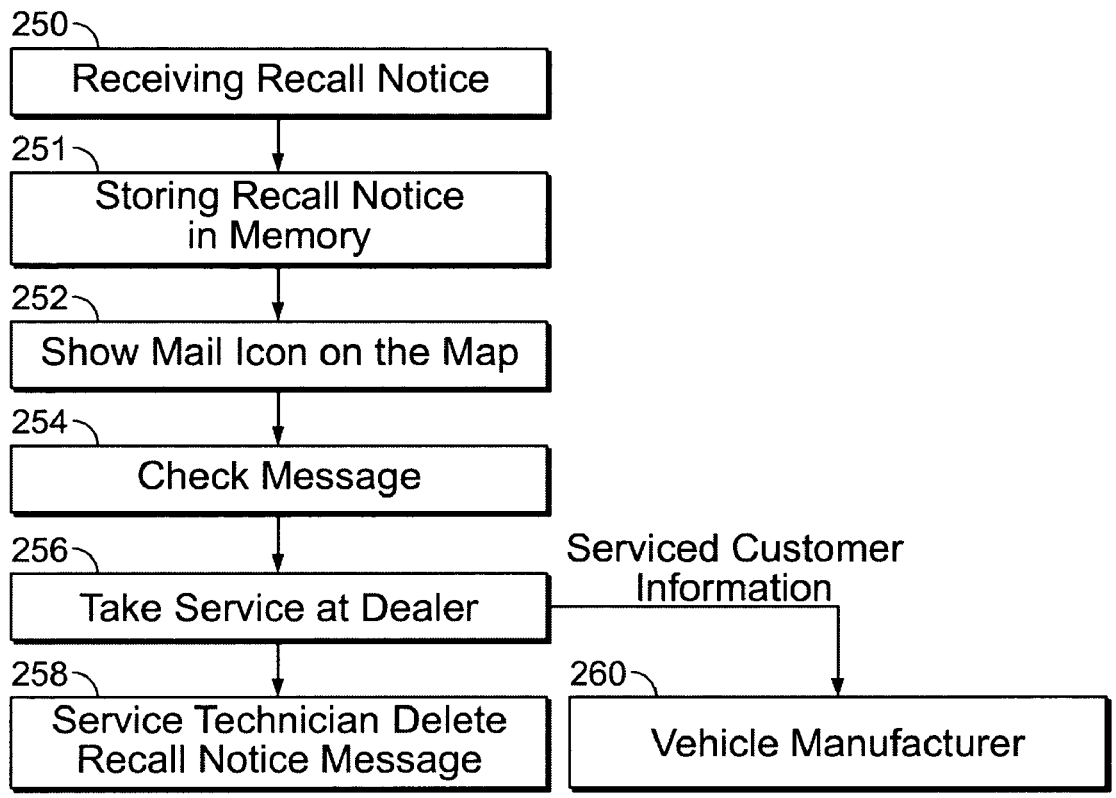
FIG. 4 outlines the steps of a method for receiving and displaying a broadcasted safety message on a vehicle.

FIG. 4 illustrates an exemplary method for the receiving of safety alerts/reminders on a vehicle 12. First, in step 250, a recall message that was sent by the vehicle manufacturer over the broadcast network 31 is received at the targeted vehicle 12. The safety message is subsequently stored in memory 30 on the vehicle 12, shown in step 251. Next, in step 252, an icon is displayed on the navigation device display to indicate to the driver that a message has been received that requires review. The vehicle owner may alternately be notified of an incoming message via an audible alert or any other message indication known in the art. In step 254, using a user interface 23 provided on the navigation device 14, the vehicle owner may select the message to be viewed graphically on the display of the navigation device 14, in an embodiment of the invention. In another embodiment, the message may be selected to be transmitted in auditory form via an audio module located in the navigation device 14. In an embodiment of the invention, the vehicle safety message will remain in protected memory 30 on the vehicle. In an embodiment, the safety message will remain in memory 30 until one of the following events occurs: (a) the message expires; (b) an authorized dealer deletes the message during a service appointment; or (c) the manufacturer issues a broadcasted cancellation of the stored vehicle safety message. The message may expire due to content preprogrammed in the safety message by the vehicle manufacturer. In one embodiment, the vehicle safety message may not be deleted directly by the vehicle owner.

Once the message is checked, the vehicle owner may at a later time take action on the message by bringing the vehicle 12 into a dealer for the recall service, shown in step 256. Once serviced, the service technician will delete the recall message from the stored memory 30 as shown in step 258 and will provide service information regarding the serviced vehicle 12 to the vehicle manufacturer, shown in step 260.

Figure 5:
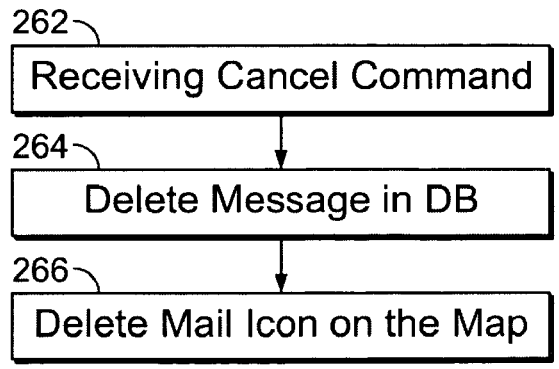
FIG. 5 outlines the steps of a method for receiving a broadcasted cancellation message on a vehicle.

In FIG. 5, if the vehicle receives a broadcasted cancellation command from the vehicle manufacturer, as shown in step 262, the navigation device processor 26 will delete the stored vehicle safety message from memory 30, shown in step 264. The navigation device processor 26 will then remove the mail icon from the navigation device display, indicated in step 266.

It will be noted that the methods outlined in FIGS. 3-5 are merely exemplary embodiments of the invention. In other embodiments, subsets, different combinations, and variations of the steps described with respect to FIGS. 3-5 can be used to communicate a vehicle safety message to a vehicle owner. Features of any of the foregoing methods and systems may be substituted or added into the others, as will be apparent to those of skill in the art.

Having thus described a preferred embodiment of a method and system for broadcasting safety messages to a vehicle, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A system in a vehicle for receiving a vehicle safety message broadcasted from a remote location, comprising:
   a receiver on the vehicle for receiving the vehicle safety message, wherein the vehicle safety message identifies: (i) a part associated with the vehicle for replacement, and (ii) a service center located in a geographic region that includes the vehicle and has the part in stock;
   a memory module operatively coupled to the receiver for storing the vehicle safety message in a manner that the vehicle safety message cannot be deleted by an owner of the vehicle;
   a display operatively coupled to the memory module for indicating the receipt of the vehicle safety message to the owner;
   a user interface operatively coupled to the display for selecting the vehicle safety message to be communicated to the owner; and
   a processor operatively coupled to at least the memory module, the receiver, and the user interface, and programmed to receive a vehicle safety cancellation message from one of the remote location and the service center and to delete the vehicle safety message from the memory module in response to the vehicle safety cancellation message.

2. The system of claim 1, wherein the receiver receives the broadcast from a satellite radio broadcast system.

3. The system of claim 1, wherein the vehicle safety message further comprises a plurality of one-to-one portions corresponding to each vehicle of a set of vehicles that are subject to the vehicle safety message.

4. The system of claim 3, wherein the processor is programmed to compare a filter code section of each of the plurality of one-to-one portions to determine if the vehicle is a member of the set of vehicles that are subject to the vehicle safety message.

5. The system of claim 4, wherein the processor is further programmed to store the vehicle safety message to the memory module if the filter code section includes a vehicle identification number corresponding to the vehicle.

6. The system of claim 1, wherein the vehicle safety message is communicated to the owner graphically on the display.

7. The system of claim 1, wherein the vehicle safety message is communicated to the owner audibly.

8. The system of claim 1, wherein the vehicle safety cancellation message is configured to be sent to the vehicle in response to a notification from the service center that the part has been replaced on the vehicle.

9. The system of claim 1, wherein the geographic region that includes the vehicle is identified by referencing a database with a vehicle identification number corresponding to the vehicle.

10. The system of claim 1, wherein the service center that has the part in stock is identified by searching a dealer parts inventory associated with the service center for the part.

11. A system for broadcasting vehicle safety messages, comprising:
    an input device for generating a vehicle safety message for replacing a part;
    a first processor that is operatively coupled to the input device and programmed to identify a service center that has the part in stock, the service center being located in a first geographic region, and identify a vehicle within the first geographic region that is subject to the vehicle safety message;
    a transmitter that is operatively coupled to the first processor for broadcasting the vehicle safety message to the vehicle via a one-to-many communications network, wherein the vehicle safety message is configured to be received by the vehicle and stored in a protected memory on the vehicle, the protected memory preventing the vehicle safety message from deletion by an owner of the vehicle; and
    wherein the first processor is further programmed to receive a notification from the service center that the part has been replaced on the vehicle and to remove the vehicle from a list of vehicles subject to the vehicle safety message.

12. The system of claim 11, wherein the transmitter broadcasts the vehicle safety message via a satellite radio broadcast system.

13. The system of claim 12, wherein the transmitter broadcasts the vehicle safety message to a plurality of vehicles within the first geographic region that are subject to the vehicle safety message; and
    wherein the vehicle safety message further comprises a plurality of one-to-one portions corresponding to each of the plurality of vehicles that are subject to the vehicle safety message.

14. The system of claim 11, wherein the first processor is further programmed to identify the vehicle in the first geographic region by referencing a database with a vehicle identification number corresponding to the vehicle that is subject to the vehicle safety message.

15. The system of claim 11, wherein the first processor is further programmed to broadcast, via the transmitter, a vehicle safety cancellation message to the vehicle in response to the notification;
    wherein the vehicle safety cancellation message is configured to delete the vehicle safety message stored in the protected memory on the vehicle.

16. The system of claim 11, wherein the first processor is further programmed to identify the service center that has the part in stock by receiving a dealer parts inventory from the service center and searching the dealer parts inventory for the part.

17. A method for broadcasting vehicle safety messages from a remote location, comprising:
    generating a vehicle safety message for replacing a part;
    identifying at least one service center that has access to the part, the at least one service center being located in a first geographic region;
    identifying at least one vehicle within the first geographic region that is subject to the vehicle safety message;
    broadcasting the vehicle safety message to the at least one vehicle via a one-to-many communications network, wherein the vehicle safety message is configured to be received by the at least one vehicle, communicated to a driver of the at least one vehicle, and stored in a protected memory on the at least one vehicle, the protected memory preventing the vehicle safety message from deletion by the driver, and wherein the vehicle safety message is further configured to be deleted after the part has been replaced by the at least one service center;
    receiving a notification that the part has been replaced on the at least one vehicle; and removing the at least one vehicle from a list of vehicles subject to the vehicle safety message in response to receiving the notification.

18. The method of claim 17, wherein broadcasting the vehicle safety message comprises broadcasting the vehicle safety message to the at least one vehicle via a satellite radio broadcast system.

19. The method of claim 17, wherein identifying the at least one vehicle in the first geographic region comprises referencing a database with vehicle identification numbers for vehicles subject to the vehicle safety message.

20. The method of claim 17, further comprising:
broadcasting a vehicle safety cancellation message to the at least one vehicle in response to receiving the notification; and
wherein the vehicle safety cancellation message is configured to delete the vehicle safety message stored in the protected memory on the at least one vehicle.

21. The method of claim 17, wherein the step of identifying at least one service center that has access to the part further comprises identifying at least one service center in the first geographic region that has the part in stock.

22. The method of claim 17, wherein the step of identifying at least one service center that has access to the part further comprises:
receiving a dealer parts inventory from the at least one service center at the remote location; and
searching the dealer parts inventory for the part.

* * * * *